(12) United States Patent
Kwon et al.

(10) Patent No.: US 12,481,871 B2
(45) Date of Patent: Nov. 25, 2025

(54) INCREMENTAL LEARNING SYSTEM WITH SELECTIVE WEIGHT UPDATES

(71) Applicants: SAMSUNG ELECTRONICS CO., LTD., Suwon-si (KR); Korea Advanced Institute of Science and Technology, Daejeon (KR)

(72) Inventors: Donghyuk Kwon, Seoul (KR); Leesup Kim, Daejeon (KR); Jaekang Shin, Hwaseong-si (KR); Seungkyu Choi, Daegu (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 987 days.

(21) Appl. No.: 17/089,764

(22) Filed: Nov. 5, 2020

(65) Prior Publication Data

US 2021/0312278 A1    Oct. 7, 2021

(30) Foreign Application Priority Data

Apr. 6, 2020    (KR) .................. 10-2020-0041638
Jul. 21, 2020   (KR) .................. 10-2020-0090452

(51) Int. Cl.
   *G06N 3/08*       (2023.01)
   *G06N 3/0895*     (2023.01)
   (Continued)

(52) U.S. Cl.
   CPC ............. *G06N 3/08* (2013.01); *G06N 3/0895* (2023.01); *G06N 3/09* (2023.01); *G06N 3/098* (2023.01); *G06N 3/0985* (2023.01)

(58) Field of Classification Search
   CPC .......... G06N 3/08; G06N 3/0895; G06N 3/09; G06N 3/091; G06N 3/092; G06N 3/094;
   (Continued)

(56) References Cited

U.S. PATENT DOCUMENTS 10,515,304 B2    12/2019  Towal
2015/0254553 A1*  9/2015  Arsovski .................. G06N 3/08
                                                        706/25

(Continued)

FOREIGN PATENT DOCUMENTS

EP    3 474 195 A1    4/2019
JP    5-324598 A      12/1993
JP    3002563 B2      1/2000

OTHER PUBLICATIONS

Ren et al., Shepard Convolutional Neural Networks, Advances in neural information processing systems 28, 1-9 (Year: 2015).*

(Continued)

*Primary Examiner* — Leonard A Sieger
(74) *Attorney, Agent, or Firm* — NSIP Law

(57) ABSTRACT

A learning method of an incremental learning model includes setting a searching range of mask weights based on either one or both of a distribution of mask weights of a binary mask corresponding to a filter of a pretrained model and a learning rate-related parameter, identifying a targeted mask weight in the searching range of the mask weights, updating the targeted mask weight based on the binary mask and the pretrained model, and updating a portion of the binary mask based on the updated targeted mask weight and a preset reference value.

19 Claims, 8 Drawing Sheets

(51) Int. Cl.
G06N 3/09 (2023.01)
G06N 3/098 (2023.01)
G06N 3/0985 (2023.01)

(58) Field of Classification Search
CPC ...... G06N 3/096; G06N 3/098; G06N 3/0985; G06N 3/045; G06N 3/048; G06N 3/082; G06N 3/084; G06N 3/044; G06F 18/214
See application file for complete search history.

(56) References Cited

U.S. PATENT DOCUMENTS

| | | | |
|---|---|---|---|
| 2016/0174902 A1* | 6/2016 | Georgescu | G06V 10/454 600/408 |
| 2018/0032867 A1* | 2/2018 | Son | G06N 3/04 |
| 2018/0253636 A1 | 9/2018 | Lee et al. | |

OTHER PUBLICATIONS

Erlich et al., A Mean-Variance Optimization Algorithm, IEEE Congress on Evolutionary Computation, 1-6 (Year: 2010).*
Ebrahimi, Sayna, et al. "Uncertainty-guided continual learning with bayesian neural networks." arXiv preprint arXiv:1906.02425 (2019). (Year: 2019).*
Wang, Hongjun, et al. "Camdrop: A new explanation of dropout and a guided regularization method for deep neural networks." Proceedings of the 28th ACM International Conference on Information and Knowledge Management. 2019. (Year: 2019).*
Hartvigsen, Thomas, et al. "Reducing Computation in Recurrent Networks by Selectively Updating State Neurons." (2019). (Year: 2019).*
Serra, J., Suris, D., Miron, M., & Karatzoglou, A. (Jul. 2018). Overcoming catastrophic forgetting with hard attention to the task. In International conference on machine learning (pp. 4548-4557). PMLR. (Year: 2018).*
He et al., "Filter Pruning via Geometric Median for Deep Convolutional Neural Networks Acceleration", 2019, Proceedings of the IEEE/CVF Conference on Computer Vision and Pattern Recognition, vol. 2019, pp. 4340-4349 (Year: 2019).*
Matsumoto et al., "Continual Learning of Image Translation Networks Using Task-Dependent Weight Selection Masks", Feb. 23, 2020, Asian Conference on Pattern Recognition, vol. 5 (2019), pp. 129-142 (Year: 2020).*
Mancini et al., "Adding New Tasks to a Single Network with Weight Transformations using Binary Masks", 2018, Proceedings of the European Conference on Computer Vision (ECCV) Workshops, vol. 2018, pp. 1-9 (Year: 2018).*
Mallya et al., "Piggyback: Adapting a Single Network to Multiple Tasks by Learning to Mask Weights", 2018, Proceedings of the European Conference on Computer Vision (ECCV), vol. 2018, pp. 67-82 (Year: 2018).*
Hung et al., "Compacting, Picking and Growing for Unforgetting Continual Learning", 2019, Advances in Neural Information Processing Systems, vol. 32 (2019), pp. 1-11 (Year: 2019).*
Tanner, Chris. "Accelerating Artificial Neural Network Learning via Weight Predictions." *Florida Institute of Technology* (7 pages in English).
Denil, Misha, et al. "Predicting parameters in deep learning." *Advances in neural information processing systems*. 2013. (9 pages in English).
Mallya, Arun, et al. "Piggyback: Adapting a single network to multiple tasks by learning to mask weights." *Proceedings of the European Conference on Computer Vision (ECCV)*. 2018. (16 pages in English).
Lee, Gunhee, et al. "Acceleration of DNN Backward Propagation by Selective Computation of Gradients." *Proceedings of the 56th Annual Design Automation Conference 2019*. 2019. (4 pages in English).

* cited by examiner

INCREMENTAL LEARNING SYSTEM WITH SELECTIVE WEIGHT UPDATES

CROSS-REFERENCE TO RELATED APPLICATIONS

This application claims the benefit under 35 USC § 119(a) of Korean Patent Application No. 10-2020-0041638 filed on Apr. 6, 2020, and Korean Patent Application No. 10-2020-0090452 filed on Jul. 21, 2020, in the Korean Intellectual Property Office, the entire disclosures of which are incorporated herein by reference for all purposes.

BACKGROUND

1. Field

The following description relates to a method and apparatus with an incremental learning model.

2. Description of Related Art

Numerous accelerators have been developed to construct a fast and effective artificial intelligence (AI) system in an edge device that uses a convolutional neural network (CNN) as an algorithm for a computer vision task. However, a serviceable task of the system largely depends on a learning model pretrained using an entire dataset (e.g., ImageNet having 1000 classes) of a remote server, which may restrict the function of existing inference engines for such systems.

To expand the application scope of models, various algorithm-based incremental learning (IL) techniques may be used. One of the goals of the IL techniques is to effectively train a model with a new task, or a set of classes, based on knowledge of a pretrained model. However, in a gradient descent algorithm-based learning process, such techniques may require a great amount of computation and memory access making direct use of the techniques difficult in an edge device.

Core computation of the typical IL includes three operations: forward propagation (FP), backpropagation (BP), and weight gradient computation (WGC). The FP and the BP may have a similar computation and data reuse pattern to that of inference, and thus the optimization of such operations have been well-established by existing techniques using unique dataflow and data characteristics. However, the typical WGC operation is greatly different from the FP and BP operations in terms of the computation and data reuse pattern.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a learning method of an incremental learning model includes setting a searching range of mask weights based on either one or both of a distribution of mask weights of a binary mask corresponding to a filter of a pretrained model and a learning rate-related parameter, identifying a targeted mask weight in the searching range of the mask weights, updating the targeted mask weight based on the binary mask and the pretrained model, and updating a portion of the binary mask based on the updated targeted mask weight and a preset reference value.

The updating of the targeted mask weight based on the binary mask and the pretrained model may include updating the targeted mask weight by determining a gradient of the targeted mask weight for each training epoch based on the binary mask and the filter of the pretrained model, and repeating the training epoch a preset number of times.

The learning method may further include resetting the searching range based on another learning rate-related parameter obtained through the repeating of the training epoch, and identifying another targeted mask weight in the reset searching range among the mask weights.

The updating of the targeted mask weight may include updating the mask weights by applying the updated targeted mask weight to the mask weights.

The binary mask may be determined for each of the mask weights by comparing the mask weights to the reference value.

The binary mask may include binary values corresponding to element values included in the filter of the pretrained model. Each of the binary values may be one of a first value for activating a corresponding element in the filter of the pretrained model, and a second value for deactivating a corresponding element in the filter of the pretrained model.

For a mask weight outside the searching range of the mask weights, the binary mask may be set to be a value for activating a corresponding element in the filter of the pretrained model.

The updating of the portion of the binary mask may include updating an element of the binary mask corresponding to the targeted mask weight among a plurality of element values included in the binary mask, based on the updated targeted mask weight and the reference value.

The identifying of the targeted mask weight may further include generating a target vector associated with a position of the targeted mask weight in the mask weights.

The updating of the targeted mask weight may further include updating the mask weights by applying the updated targeted mask weight to the mask weights based on the generated target vector.

The updating of the portion of the binary mask may further include updating an element corresponding to the targeted mask weight in the binary mask based on a result of comparing the targeted mask weight and the reference value, based on the generated target vector.

The setting of the searching range may include either one or both of setting the searching range based on a mean of the mask weights from the distribution of the mask weights and setting the searching range based on a learning rate-related parameter configured to determine a level of learning rate decay.

The setting of the searching range based on the mean of the mask weights from the distribution of the mask weights may further include setting the searching range based on a variance of the mask weights from the distribution of the mask weights.

The learning method may further include initializing the binary mask by initialing a mask weight of the binary mask corresponding to the filter of the pretrained model to be a constant greater than the reference value, and determining the distribution of the mask weights by performing a training epoch for updating the mask weights based on the binary mask and the pretrained model.

In another general aspect, a learning apparatus for an incremental learning model includes one or more processors configured to set a searching range of mask weights based on either one or both of a distribution of the mask weights of a binary mask corresponding to a filter of a pretrained model and a learning rate-related parameter, identify at least one targeted mask weight in the searching range of the mask weights, update the targeted mask weight based on the binary mask and the pretrained model, and update a portion of the binary mask based on the updated targeted mask weight and a preset reference value, and a memory configured to store therein the targeted mask weight.

For the updating of the targeted mask weight, the one or more processors may update the targeted mask weight by obtaining a gradient of the targeted mask weight for each training epoch based on the binary mask and the filter of the pretrained model and record the updated targeted mask weight in the memory, and repeat the training epoch by a preset number of times.

The one or more processors may reset the searching range based on another learning rate-related parameter obtained through the repeating of the training epoch, and identify another targeted mask weight in the reset searching range among the mask weights.

The binary mask may be determined to be a binary value for each of the mask weights by comparing the mask weights to the reference value.

The binary value may be one of a first value for activating a corresponding element in the filter of the pretrained model, and a second value for deactivating a corresponding element in the filter of the pretrained model.

For a mask weight not in the searching range among the mask weights, the binary mask may be set to be a value for activating a corresponding element in the filter of the pretrained model.

For the identifying of the targeted mask weight, the one or more processors may generate a target vector associated with a position of the targeted mask weight in the mask weights and record the generated target vector in the memory. For the updating of the targeted mask weight, the one or more processors may update the mask weights by applying the updated targeted mask weight to the mask weights.

The memory may store therein the target vector associated with the position of the targeted mask weight in the mask weights. For the updating of the portion of the binary mask, the one or more processors may update an element corresponding to the targeted mask weight in the binary mask based on a result of comparing the targeted mask weight and the reference value.

The distribution of the mask weights may include a mean and a standard deviation of the mask weights.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
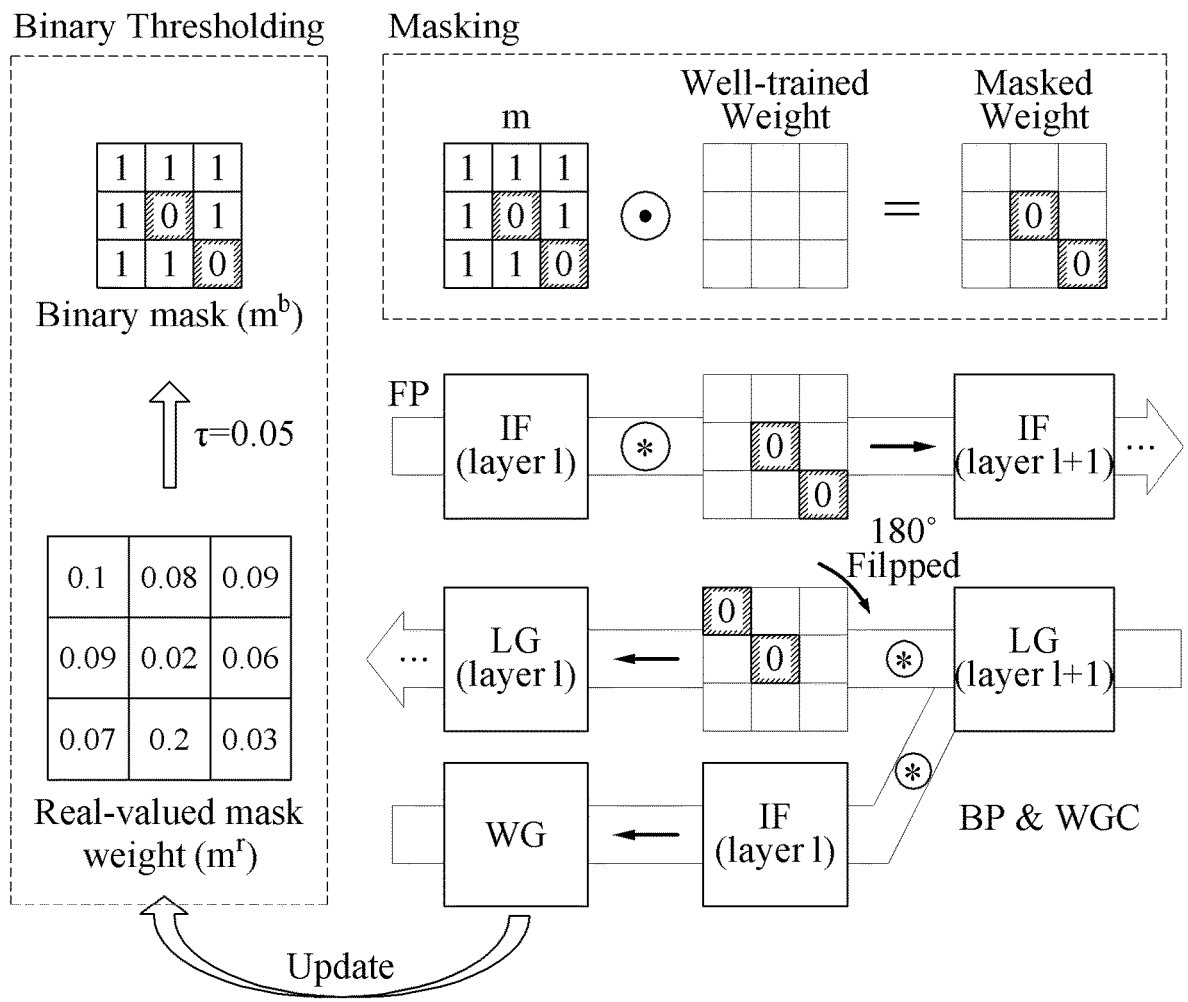
FIG. 1 is a diagram illustrating an example of learning a binary mask for each task.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s). Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

An aspect provides a selective weight update (SWU) method to reduce latency and memory access. The method may include identifying weights to be activated from among weights of a pretrained model at an initial stage of a learning process and performing weight gradient computation (WGC) selectively on weights to be deactivated excluding the identified weights, in a remainder of the learning process. Another aspect provides a method of selecting some weights to be updated without degrading or decaying the quality of learning.

An incremental learning (IL) process may be distinguished from a general learning process in that learning starts from a model well-trained with a global dataset. In addition, assuming that the domain of additionally learned images is similar to that of the global dataset, it may be assumed that the weights of a feature extraction layer (e.g., a convolutional layer) of the pretrained model would not significantly vary. By learning or training a binary mask for each task while not directly changing the weights of the pretrained model, it is possible to successfully learn a new task, or a set of new classes. This may indicate that the feature extraction layer adapts to the new task by deactivating (i.e., masking with 0) 4 to 30% of the weights of the pretrained model.

An aspect of this disclosure may provide a selective weight update (SWU) method to reduce latency and memory access. The method may identify weights to be activated from among weights of a pretrained model at an initial stage of a learning process, and perform weight gradient computation (WGC) selectively on weights to be deactivated, excluding the identified weights, at a remaining stage of the learning process.

Another aspect of this disclosure may provide an architecture for implementing selective WGC. In terms of hardware, even though an Internet of things (IoT) device has limited resources, its inference function should not be hindered. Thus, it may not be feasible or practical to design a dedicated architecture or to dispose a large device in an accelerator to implement the selective WGC. Thus, to implement the selective WGC based on an architecture of a general neural processing unit (NPU), provided herein is a new and multi-window dataflow using a window batch device. In addition, to allow an accelerator to effectively process the selective WGC, introduced herein are two pre-epoch processes: mask weight compression and channel reordering.

FIG. 1 is a diagram illustrating an example of learning a binary mask for each task.

In FIG. 1, binary mask learning may include a gradient descent algorithm-based convolutional neural network (CNN) learning process that may include three main operations of forward propagation (FP), backpropagation (BP), and weight gradient computation (WGC). In an example, each of the three operations may be performed as a convolution of two different input tensors in a convolutional layer of a learning model. The binary mask learning may be an additional learning process, including thresholding, masking, and updating.

During a learning process, a binary mask matrix $m^b$ may have a real-valued mask weight matrix $m^r$ having the same size as a filter of a pretrained learning model. For example, a binary mask may be generated through binary thresholding in a hard binary manner using a predefined threshold value $\tau$. In this example, when a mask weight is greater than or equal to the predefined threshold value $\tau$, a corresponding mask may be 1, and be 0 otherwise.

In an example, a binary mask in FP and BP may activate or deactivate each weight in a pretrained filter through elementwise multiplication called masking. Then a masked filter may be used in a convolution process in lieu of the pretrained filter. In WGC, weight gradients (WG) calculated by a convolution between an input feature (IF) map and a loss gradient (LG) map may be used to update a real-valued mask weight, not a pretrained weight.

A convolution in WGC may have different characteristics when compared to those in FP and BP. Firstly, in the WGC, two inputs IF and LG of a convolution may have almost the same size, which may result in the convolutional window being considerably larger than those in the FP and the BP. Secondly, the two inputs (IF and LG) are three-dimensional (3D) tensors, and thus a 3D convolution may be performed in lieu of a four-dimensional (4D) convolution. For example, when the IF and the LG have $C_I$ channels and $C_O$ channels, respectively, a convolution may be performed on each of all the channels, and $C_I \times C_O$ weight gradient channels may be output. An equation for the WGC may be represented by Equation 1 below.

$$g_{m,n}^{c_I,c_O} = \sum_{i=0}^{H-k} \sum_{j=0}^{W-k} f_{i,j}^{c_O} \cdot a_{i+m,j+n}^{c_I} \qquad \text{Equation 1}$$

In Equation 1, $g_{m,n}^{c_I,c_O}$, $l_{i,j}^{c_O}$, and $a_{i+m,j+n}^{c_I}$ denote a (m, n) weight gradient on a $WG^{c_I,c_O}$ channel, a (i, j) loss gradient on a $LG^{c_O}$ channel, and a (i+m, j+n) input activation on an $IF^{c_I}$ channel, respectively.

Figure 2A:
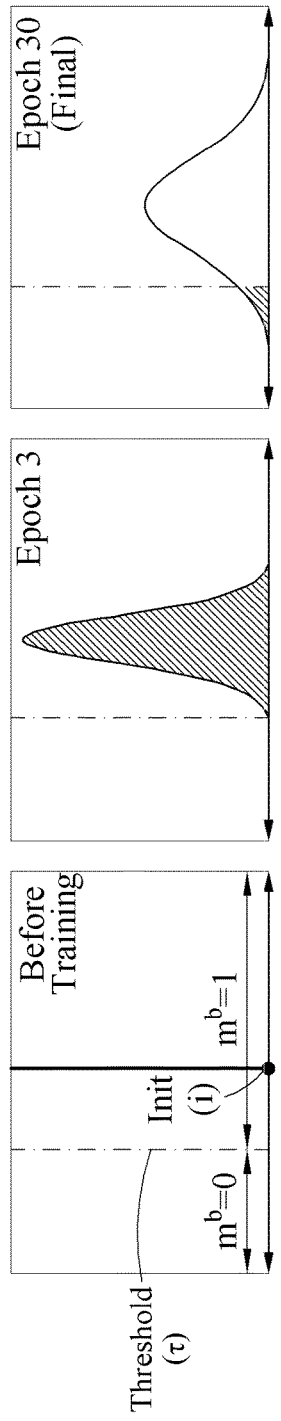
FIGS. 2A and 2B are diagrams illustrating examples of a distribution of real-valued mask weights $m^r$ of a convolutional layer during a learning process.
Figure 2B:
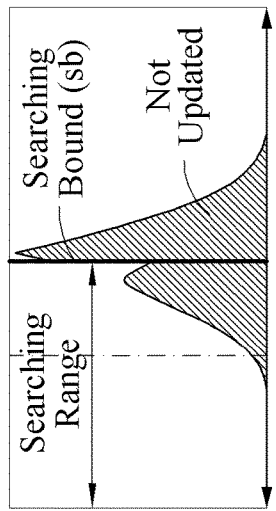

FIGS. 2A and 2B are diagrams illustrating examples of a distribution of real-valued mask weights $m^r$ of a convolutional layer during a learning process.

In FIG. 2A, all $m^r$ values may be initialized to be a constant i greater than a threshold value $\tau$ before training. Since the constant i is greater than the predefined threshold value $\tau$, all binary masks $m^b$ are 1. That is, all pretrained weights may be activated at an initial stage of the learning. As illustrated in FIG. 2A, as the learning proceeds, for example, from Epoch 3 to Epoch 30, the $m^r$ distribution may become a Gaussian distribution. In addition, as the distribution broadens, a mask which is 0 may be generated, and some of the pretrained weights may be deactivated.

Summarily, learning of a binary mask may be a process of searching for a pretrained weight to be deactivated by a trained $m^r$. For example, when a dataset of a new task is in a similar domain as a pretrained dataset, a portion of weights to be deactivated may be high.

According to an example embodiment, provided herein is an SWU technique that narrows a searching space for weights to be deactivated by observing an $m^r$ distribution at an initial stage of learning.

A range of mask weights may be divided into two: a searching range and a non-searching range as illustrated in FIG. 2B. A mask weight in the searching range will be hereinafter referred to as a targeted mask weight, and a mask weight in the non-searching range will be hereinafter referred to as an untargeted mask weight. Before training starts, the searching range may be set to be $(-\infty, +\infty)$. As a searching bound sb of the searching range moves during the training, the searching range may be narrowed to be $(-\infty, sb)$. By updating only targeted mask weights in the searching range, it is possible to get rid of unnecessary computations.

Figure 2C:
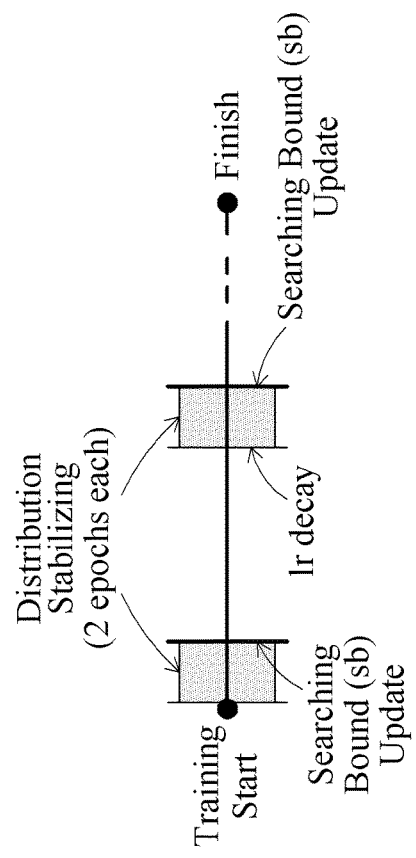
FIG. 2C is a diagram illustrating an example of a timeline for selective weight update (SWU).

FIG. 2C is a diagram illustrating an example of a timeline for SWU. In FIG. 2C, a searching bound sb may be updated to narrow a searching range in two situations: after training starts or after a learning rate lr decays. An initial searching bound sb may be determined based on an $m^r$ distribution of a layer. For example, the initial searching bound sb may be set to be a mean of $m^r$ values of the layer. In this example, approximately half of the $m^r$ values may be included in the searching range. Such a decaying learning rate lr may result in a decrease in variation of mask weights, and thus the searching range may be narrowed further after the learning rate lr decays. Thus, the searching bound sb may be updated such that a gap between a threshold value T and the searching bound sb decreases by a learning rate decay factor.

To identify a targeted mask weight, a target vector may be generated. Before every training epoch starts, each mask weight may be compared to a searching bound sb of a layer to generate a target vector. "T" in a target vector may indicate a position of a targeted mask weight in a searching range, and "U" indicates the opposite.

Figure 3:
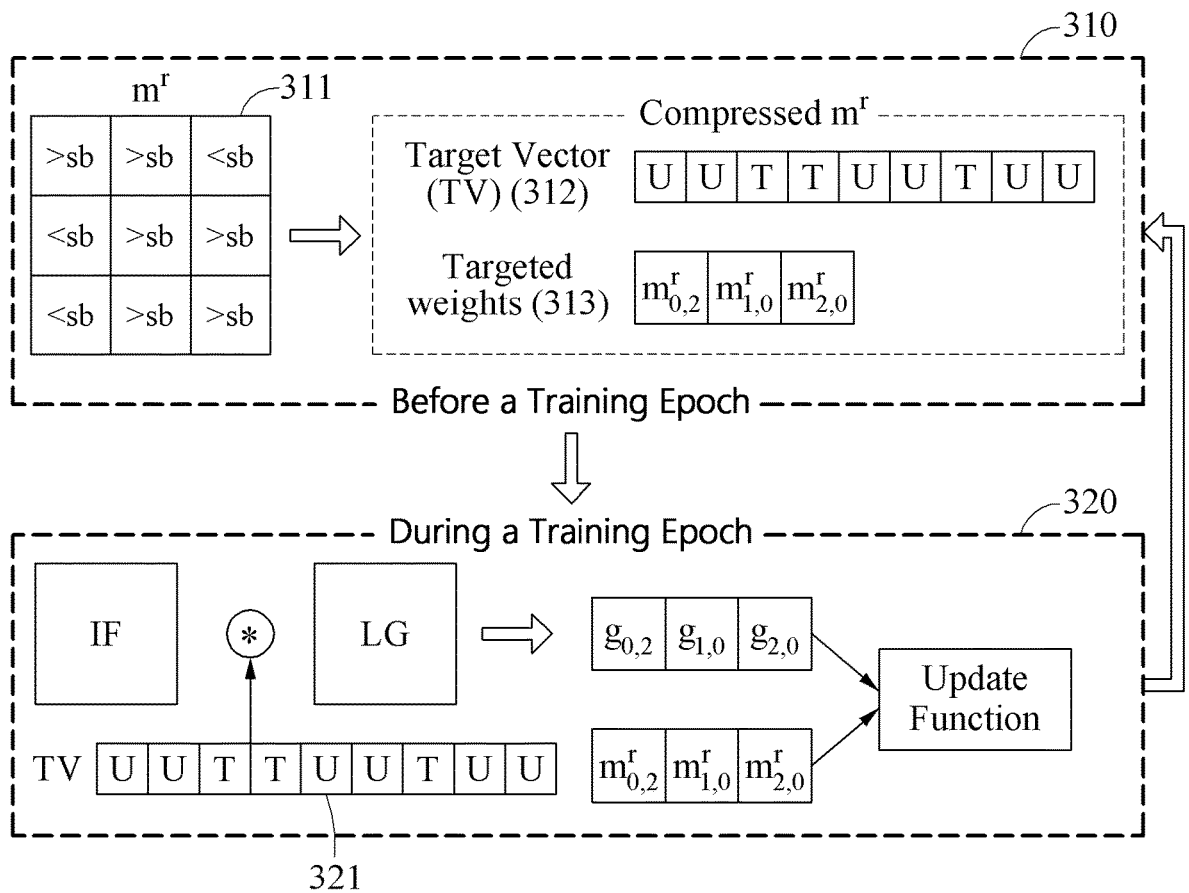
FIG. 3 is a diagram illustrating an example of SWU.

FIG. 3 is a diagram illustrating an example of SWU.

In an example, when a mask weight is out of a searching range, an accurate value of the mask weight out of the searching range may not be needed because it is not updated further, leaving its binary mask as 1. As illustrated in a block 310 on an upper end side of FIG. 3, only targeted mask weights 313 of mask weights $m^r$ 311 may be compressed to be stored, and thus positional information of the mask weights $m^r$ 311 may be stored in target vectors 312. As illustrated in a block 320 on a lower end side of FIG. 3, only a weight gradient at a T position of target vectors 321 may be calculated such that an elementwise $m^r$ update is performed. The generation of target vectors and the $m^r$ compression may be performed only once per epoch, and thus latency for the compression may be negligibly short compared to a main training process.

| Algorithm 1 Pseudo-code for the SWU technique |
| --- |
| Input: the pre-trained model, W; the total epochs of the training, epoch$^{tot}$; a list of epochs where lr decays, lr_sched; the number of epochs to stabilize the distribution, $T_{stab}$; an initial value for $m^r$, i; an initial learning rate, $lr_{init}$; a learning rate decaying factor, $\alpha$; <br> Initialize: sb ← ∞, lr ← $lr_{init}$, $m^r[:]$ ← i <br> 1: for e = 1 to epoch$^{tot}$ do <br> 2:   if e ∈ lr_sched then |

| Algorithm 1 Pseudo-code for the SWU technique |
| --- |
| 3:     lr ← lr * $\alpha$ <br> 4:   if e == $T_{stab}$ or (e − $T_{stab}$) ∈ lr_sched then <br> 5:     sb ← (sb − τ) * $\alpha$ + τ <br> 6:     $m^r$, TV ← MaskWeightCompression($m^r$, sb) <br> 7:     CO ← COgeneration(TV) <br> 8:     $m^r$, $m^b$ ← TrainWithSWU($m^r$, $m^b$, W, Dataset) <br> return $m^b$ |

The overview of the technique provided herein is described in algorithm 1 above. In algorithm 1, lines 2 to 7 may indicate pre-epoch processes for SWU, such as learning rate lr and searching bound sb updates, and $m^r$ compression.

An architecture provided herein may support SWU on a typical neural processing unit (NPU) architecture for an Internet of things (IoT) device having inference and training functions. The terms "learning" and "training" are interchangeably used herein. According to an example embodiment, provided herein is a multi-window MW dataflow with a window placement unit (WPU) and a channel reordering function to implement selective WGC on a general NPU architecture such as DianNao with minimal overheads.

Figure 4A:
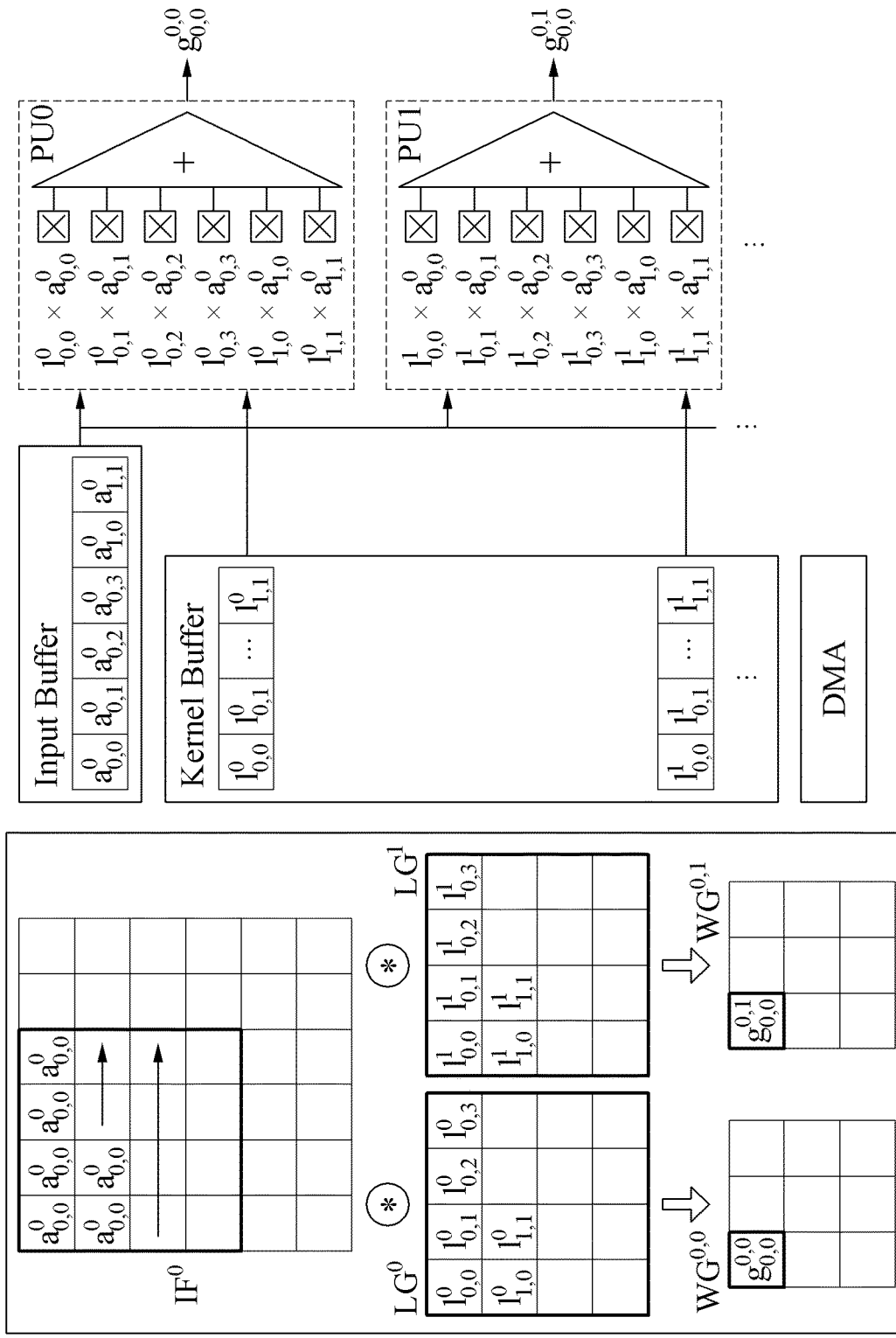
FIGS. 4A and 4B are diagrams illustrating examples of dataflow in SWU.

The dataflow in WGC may be distinguished from those in FP and BP due to its convolutional characteristic described above. FIG. 4A illustrates dataflow in a typical WGC when an accelerator has a DianNao-like memory hierarchy and processing units (PUs), including multipliers and adder-trees. There are two types of on-chip buffers: an input buffer and a kernel buffer. The input buffer may globally spread data to all the PUs, and the kernel buffer may locally multicast different data to each PU.

As illustrated in FIG. 4A, the input buffer and the kernel buffer may be in charge of IF and LG, respectively, and each PU may output a weight gradient WG in different channels. Here, element values in a same two-dimensional (2D) convolutional window may be calculated together. Thus, the buffers may simultaneously cast the element values in the same convolutional window.

However, the selective WGC may not be implemented with an existing dataflow because IF is transmitted to all adder-trees globally. That is, all the PUs may calculate or compute weight gradients WG at the same position of each channel. For the selective WGC, each PU may need to produce weight gradients WG at different positions independently. To this end, provided herein is a new dataflow which is a multi-window MW dataflow using WPUs.

As described above, since the sizes of two inputs are almost the same, a convolutional window in WGC may be large. For example, when the size of IF is 28×28 and the size of weight gradients WG is 3×3, the size of its convolutional window may be 26×26. This may indicate that almost all element values of an IF map, for example, approximately 86% of a 28×28 map, may be used in a calculation of one weight gradient. The multi-window MW dataflow provided herein may be originated from this observation.

Figure 4B:
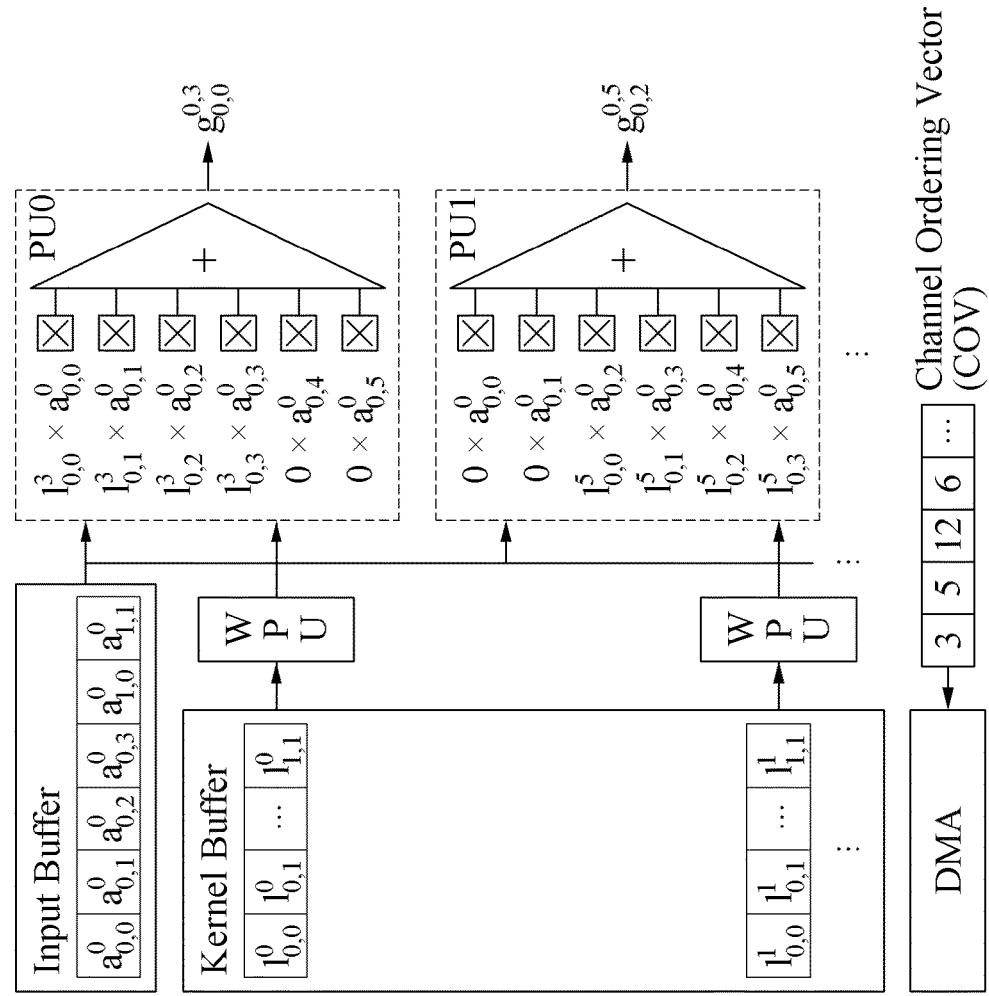
Figure 4B:
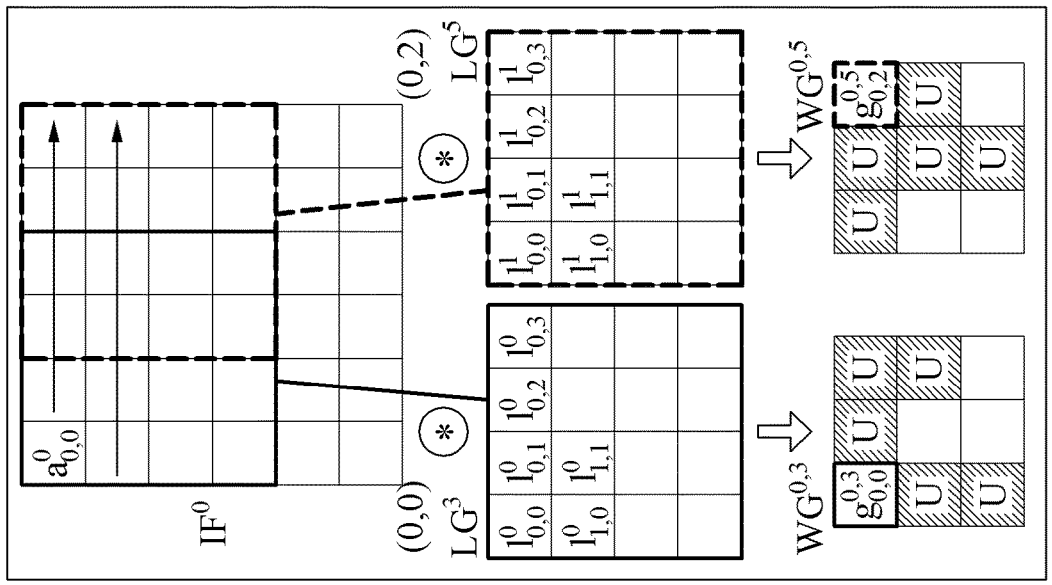

FIG. 4B illustrates an example of a multi-window MW dataflow. In FIG. 4B, the sizes of IF, LG, and weight gradients WG are 6×6, 4×4, and 3×3, respectively, and the number Tm of multipliers per PU is 6. A first PU calculates a weight gradient $g_{0,0}$, and a second PU calculates a weight gradient $g_{0,2}$.

To simultaneously calculate two weight gradients at different positions, an input buffer may broadcast activated inputs, for example, $a_{0,0}$ to $a_{0,5}$, to PUs without considering a position. Instead, WPUs may match loss gradients transmitted from a kernel buffer to corresponding activated inputs based on positional information from target vectors. For example, the first PU should not include $a_{0,4}$ and $a_{0,5}$ in its calculation, and thus a WPU may insert 0 in fifth and sixth multipliers. In the case of the second PU, a WPU may insert 0 in first and second multipliers, and displace the activated inputs in third to sixth multipliers.

The example of FIG. 4B shows that the multi-window MW dataflow causes some overheads due to unnecessary input features mapped to PUs. However, a latency overhead may not be significant due to a large convolutional window.

TABLE 1

| | IF Size | | | |
|---|---|---|---|---|
| | 56 × 56 | 28 × 28 | 14 × 14 | 7 × 7 |
| Overhead (%) | 16.67 | 18.59 | 20.00 | 28.57 |

Table 1 above indicates latency overheads according to the size of IF when the size of weight gradients WG is 3×3 and Tm=16. Since utilization drops when the size of IF is small, a maximum latency overhead may occur when the size of IF is 7×7. Despite PU underutilization, overall training latency may be reduced eventually because an unnecessary WGC is skipped.

When each of PUs generates different numbers of weight gradients by WG channels, the utilization of the PUs may decrease due to a load imbalance. Thus, the channels may need to be reordered based on the number of weight gradients to be calculated, which is the same as the number of Ts in target vectors. The target vectors may be updated each epoch, and thus channel reordering may be performed each epoch.

The channel reordering may be performed by generating channel ordering (CO) vectors without changing physical addresses of LG and WG. The CO vectors may be a series of channel indices arranged by the number of Ts in the target vectors. The CO vectors may be transmitted to a direct memory access (DMA) engine to read LG maps from an external memory to the kernel buffer. As illustrated in FIG. 4B, both $LG^3$ and $LG^5$ may calculate the same number of weight gradients, which is, for example, 4. Thus, loads of two PUs may be balanced. The CO vectors may be used again when the calculated weight gradients are written back in the external memory.

In addition, when all the weight gradients of a channel are skipped, that is, all the element values of a target vector are U, channel dropping that drops indices of channels from the CO vectors may be performed. Through such channel dropping, the LG maps may not be read from the external memory, and thus the number of off-chip accesses may be reduced accordingly.

Figure 5:
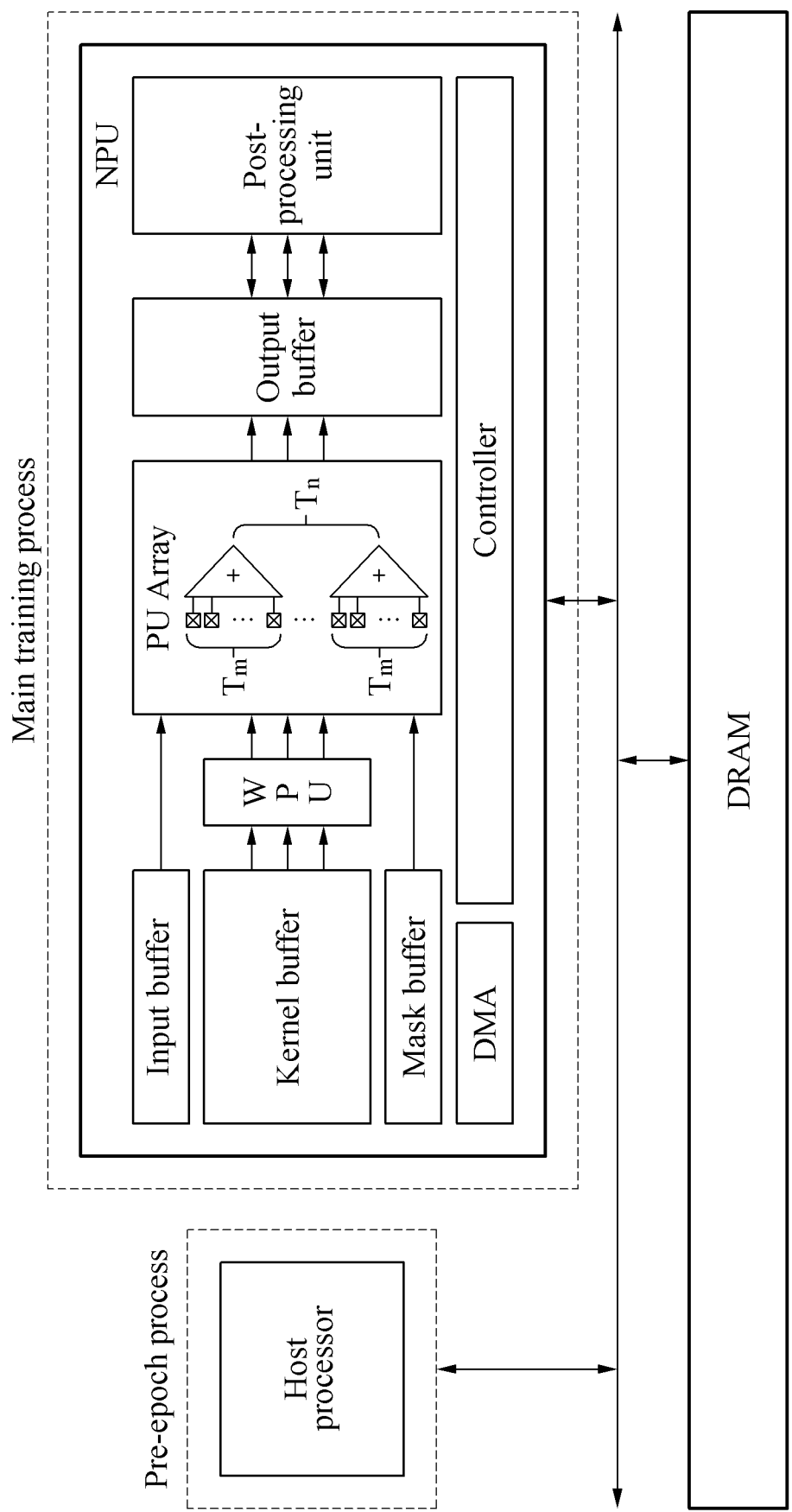
FIG. 5 is a diagram illustrating an example of an architecture of an apparatus for performing SWU.

FIG. 5 is a diagram illustrating an example of an architecture of an apparatus for performing SWU. An NPU architecture may include a PU array, input and kernel buffers, a DMA engine, and a post-processing unit for batch normalization, rectified linear unit (ReLU) functions, pooling, and weight updates. The PU array may include Tn PUs including Tm multipliers. Additional components for the implementation of selective WGC may include a WPU and a mask buffer. The mask buffer may be a storage for a per-task binary mask. Each of the multipliers may be modified to be gated by masks to support masking, and the binary mask generation (or thresholding) may be performed using a comparator in the post-processing unit, for example, a ReLU. An NPU may perform a main training process including primarily multiply-accumulate (MAC) operations. A host processor may be in charge of pre-processes such as $m^r$ compression and channel reordering.

Figure 6:
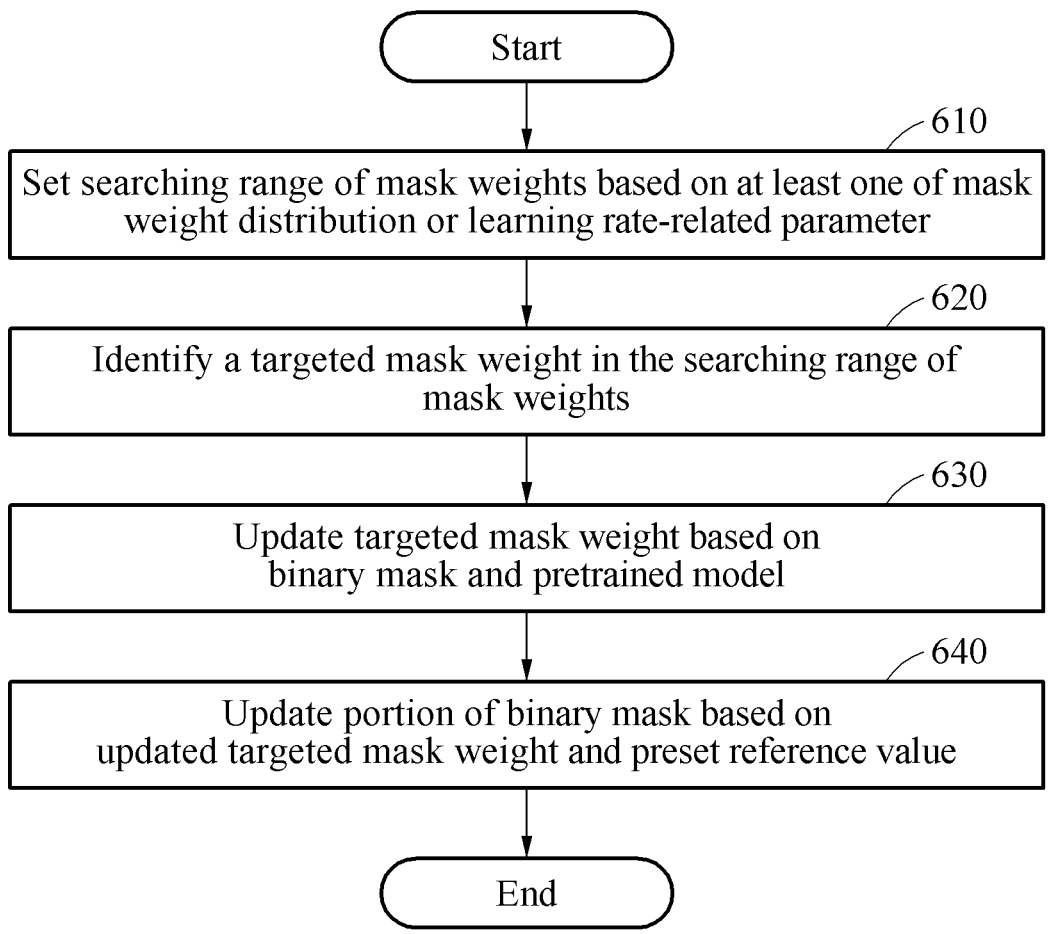
FIG. 6 is a flowchart illustrating an example of a learning method of an incremental learning model.

FIG. 6 is a flowchart illustrating an example of a learning method of an incremental learning model. The learning method of the incremental learning model to be described hereinafter may correspond to a learning method based on the SWU technique described above.

In FIG. 6, the learning method of the incremental learning model includes operation 610 of setting a searching range based on either one or both of a mask weight distribution and a learning rate-related parameter, operation 620 of identifying at least one targeted mask weight in the searching range from a plurality of mask weights, operation 630 of updating the targeted mask weight based on a binary mask and a pretrained model, and operation 640 of updating a portion of the binary mask based on the updated targeted mask weight and a preset reference value.

Operation 610 of setting the searching range may include setting the searching range based on either one or both of the mask weight distribution of the binary mask corresponding to a filter of the pretrained model and the learning rate-related parameter. In operation 610, the filter of the pretrained model may include a pretrained weight.

In operation 610, the binary mask may include a binary mask matrix $m^b$ which is described above. The binary mask may correspond to the filter of the pretrained model, and include binary values respectively corresponding to element values in the filter of the pretrained model to activate or deactivate some of the element values in the filter of the pretrained model. That is, each element of the binary mask may be set to be one of a first value to activate a corresponding element in the pretrained filter and a second value to deactivate a corresponding element in the pretrained filter. The binary mask may be configured as a matrix of the same size as the filter of the pretrained model as described above, but not limited to the form of a matrix. Hereinafter, an example in which the binary mask is set to be 1 to activate an element in the filter of the pretrained model and to be 0 to deactivate an element in the filter of the pretrained model will be described.

In operation 610, the mask weights may include a real-valued mask weight matrix $m^r$ which is described above. The mask weights may correspond to the binary mask, and each of the mask weights may correspond to each of the element values included in the binary mask. As described above, the mask weights may be configured by a matrix of the same size as the filter of the pretrained model, but not limited to the form of a matrix.

In operation 610, the mask weight distribution may be a distribution of the mask weights, and include a statistical distribution of the mask weights. For example, based on the mask weight distribution, a mean, a variance, and a standard deviation of the mask weights may be determined. In operation 610, the learning rate-related parameter may be a parameter set in the learning model, and include a learning rate decay factor. The setting of the searching range will be described in detail with reference to FIG. 7.

In operation 620 of identifying the targeted mask weight, the searching range may be determined by a searching bound sb as described above. In operation 620, the targeted mask weight may be a targeted mask weight described above. That is, operation 620 of identifying the targeted mask weight may include compressing mask weights $m^r$ to store only the targeted mask weight. Operation 620 of identifying the targeted mask weight may further include generating a target vector associated with a position of the targeted mask weight in the mask weights. By applying, to the mask weights, the updated targeted mask weight based on the generated target vector, it is possible update the mask weights. For example, the updating of the mask weights may include identifying, from the mask weight matrix, a position of a weight out of the searching range and a position of a weight in the searching range, based on the target vector, and storing a result of updating the weight in the searching range in the mask weight matrix. In such a case, a weight value may not be stored in the position of the weight out of the searching range in the mask weight matrix.

Operation 630 of updating the targeted mask weight may include updating the targeted mask weight according to FP, BP, and WGC operations. As described above, operation 630 of updating the targeted mask weight may include updating the mask weights by performing masking to activate or deactivate each weight in the pretrained filter using the binary mask, and performing a training epoch of FP, BP, and WGC using the masked filter. In operation 630 of updating the targeted mask weight may include updating the mask weights by applying the updated targeted mask weight to the mask weights. In an example, a mask weight out of the searching range may not be updated in the training process, and thus the mask weight out of the searching range may not be stored. That is, the mask weight out of the searching range may not be stored, and a corresponding value of the binary mask may be fixed as a value set during the training process.

The training epoch associated with a calculation of a gradient of the targeted mask weight may be repeated several times. In an example, the updating of the targeted mask weight may include updating the targeted mask weight by obtaining a gradient of the targeted mask weight for each training epoch based on the filter of the pretrained model and the binary mask. That is, the targeted mask weight may be updated for each training epoch, and the searching range may be reset based on a learning rate-related parameter that is obtained through the repetition of the training epoch. When the searching range is reset, at least one targeted mask weight corresponding to the reset searching range may be identified again from the mask weights, and the reidentified targeted mask weight may be updated for each training epoch. The resetting of the searching range will be described in detail with reference to FIG. 7.

Operation 640 of updating the portion of the binary mask may include determining a binary mask corresponding to the targeted mask weight by comparing the targeted mask weight updated in operation 630 and a preset reference value. In operation 640, the preset reference value may correspond to a predefined threshold value T described above. That is, the portion of the binary mask may indicate the binary mask corresponding to the targeted mask weight. The binary mask may be determined for each of the mask weights by comparing the mask weights and the reference value. In an example, an element of the binary mask corresponding to a weight not in the searching range among the mask weights may be set to be 1. That is, a weight that is not the targeted mask weight may not be updated in operation 630, and thus an element of the binary mask corresponding to this weight may not be updated. Thus, even when the training epoch is repeated several times according to the training process, the set value, for example, 1, may be fixed.

Figure 7:
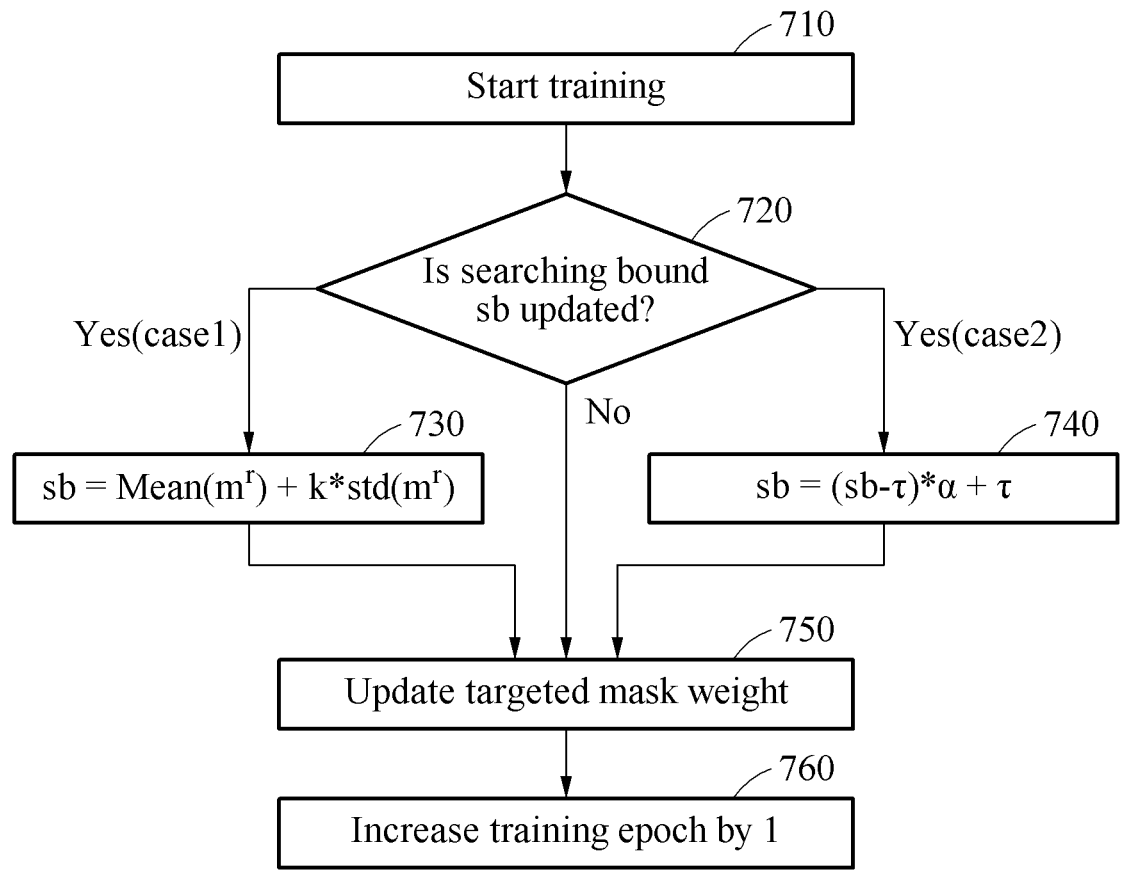
FIG. 7 is a flowchart illustrating an example of setting a searching range.

FIG. 7 is a flowchart illustrating an example of setting a search range.

In FIG. 7, the setting of the searching range includes operation 710 of starting training, operation 720 of determining whether a searching bound sb is updated or not, operations 730 and 740 of updating the searching bound sb in a first case and a second case in response to a result of determining whether the searching bound sb is updated, operation 750 of updating a targeted mask weight in the searching range determined by the searching bound, and operation 760 of repeating a training epoch.

The first case may occur at an initial stage of training. In the first case, mask weights may indicate a certain distribution such as a Gaussian distribution. For example, the first case may be a case in which mask weights indicate a Gaussian distribution after a training epoch is repeated twice. That is, the mask weights may be updated for each training epoch. The first case may be a case in which the updated mask weights indicate a certain distribution. The first case may be a case in which the number of training epochs by which mask weights indicate a certain distribution is set in advance, and a training epoch is performed by the set number of times.

The learning method may include initializing the mask weights to be a constant greater than a reference value before the training starts. Thus, all the mask weights may be greater than the reference value, and thus the binary mask may all be initialized to be 1. The learning method may include obtaining a mask weight distribution by performing a training epoch for updating the mask weights based on the initialized binary mask and a pretrained model. That is, the first case may be a case in which the mask weight distribution is obtained.

In the first case, the searching range may be updated based on the mask weight distribution. For example, In FIG. 7, in the first case, the searching bound sb may be updated based on a mean (mean($m^r$)) and a standard deviation (std($m^r$)) of the mask weights, as represented by an equation in operation 730. In operation 730, k denotes a preset constant. By adjusting a value of k, it is possible to adjust a reduction of the searching range. For example, when k is set to be a great value, or a positive value, the searching bound sb may be updated to be a relatively great value, and thus the reduction of the searching range may be small, compared to when k is set to be a small value. In addition, the number of targeted mask weights to be updated may be reduced slowly, and thus a relative computation amount and a relative memory usage may be great, and relative training accuracy may be high. When k is set to be a small value, or a negative value, a result opposite to the foregoing may be obtained.

The second case may be a case in which a learning rate-related parameter changes. For example, the second case may be a case in which a learning rate decay factor is determined to change based on a preset standard. In the second case, the searching range may be updated based on the learning rate-related parameter. For example, In FIG. 7, in the second case, the searching bound sb may be updated based on a learning rate decay factor $\alpha$ as represented by an equation in operation 740. For example, the searching bound sb may be updated such that a gap (sb-τ) between the searching bound sb and the reference value is reduced by the learning rate decay factor $\alpha$.

When the searching bound sb is not updated, the searching range may not change and the targeted mask weight in the searching range may be the same. Thus, the same targeted mask weight may be updated according to the training epoch.

In contrast, when the searching bound sb is updated in operation 730 and 740, the searching range may change, and thus the targeted mask weight may also change. That is, at least one targeted mask weight corresponding to the changed searching range may be reidentified from the mask weights. In such a case, the reidentified targeted mask weight may be updated according to the training epoch.

According to an example embodiment, a learning method may be performed by at least one processor included in a learning apparatus described herein. A targeted mask weight and a binary mask may be recorded in a memory of the learning apparatus. That is, the learning apparatus of an incremental learning model described herein may include the at least one processor that may set a searching range based on at least one of a mask weight distribution of mask weights of a binary mask corresponding to a filter of a pretrained model or a learning rate-related parameter, identify at least one targeted mask weight corresponding to the searching range from among the mask weights, update the targeted mask weight based on the binary mask and the pretrained model, and update a portion of the binary mask based on the updated targeted mask weight and a preset reference value, and include the memory that may store the targeted mask weight. In addition, the processor may generate a target vector associated with a position of the targeted mask weight in the mask weights, record the generated target vector in the memory, and update the portion of the binary mask using the targeted mask weight and the target vector that are recorded in the memory.

According to example embodiments described herein, it is possible to successfully improve the performance in a WGC operation and the energy efficiency with a minimum overhead. By compressing and storing only a mask weight for which learning needs to continue among all mask weights in a binary mask, it is possible to reduce a memory usage occupied by mask weights during learning. In addition, by repeating a training epoch while narrowing a range of mask weights for which weight gradients are to be calculated, it is possible to reduce learning latency that may occur due to the calculation of the weight gradients.

The learning apparatus, host processor, input buffer, kernel buffer, mask buffer, DMA, WPU, controller NPU, output buffer, DRAM and other apparatuses, devices, units, modules, and components described herein with respect to FIGS. 1 and 5 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method, comprising:
    setting a searching range of mask weights based on both of a distribution of the mask weights of a binary mask corresponding to a filter of a pretrained model and a learning rate-related parameter set in an incremental learning model;
    identifying a targeted mask weight in the searching range of the mask weights;
    calculating a weight gradient corresponding to the targeted mask weight based on an input activation of an input channel of a masked filter obtained from forward propagation of a training epoch process and a loss gradient obtained from back propagation of the training epoch process, wherein the masked filter is obtained by activating or deactivating each weight included in the filter based on the binary mask;
    updating the targeted mask weight based on the weight gradient;
    updating a portion of the binary mask corresponding to the updated targeted mask weight based on and a preset reference value; and
    updating the masked filter by applying the updated the binary mask to the masked filter for a next training epoch process of the pretrained model,
    wherein the setting of the searching range comprises:
        when the distribution of the mask weights is obtained, setting the searching range based on a mean of the mask weights from the distribution of the mask weights; and
        when it is determined that the learning rate-related parameter that determines a level of learning rate decay has changed according to predefined criteria, setting the searching range based on the level of learning rate decay,
    wherein the training epoch process is included in a process for training the pretrained model, which is configured to perform a first task, to perform a second task,
    wherein a non-target mask weight not in the searching range is not updated during the training epoch process and is fixed as a value determined in a previous training epoch, and
    wherein a value of the binary mask corresponding to the non-targeted mask weight is fixed as a value determined in the previous training epoch.

2. The method of claim 1, wherein the updating of the targeted mask weight comprises:
    repeating the training epoch a preset number of times.

3. The method of claim 2, further comprising:
    resetting the searching range based on another learning rate-related parameter obtained through the repetition of the training epoch; and
    identifying another targeted mask weight in the reset searching range among the mask weights.

4. The method of claim 1, wherein the updating of the targeted mask weight comprises:
    updating the mask weights by applying the updated targeted mask weight to the mask weights.

5. The method of claim 1, wherein the binary mask is determined for each of the mask weights by comparing the mask weights to the reference value.

6. The method of claim 1, wherein the binary mask comprises:
    binary values corresponding to element values included in the filter of the pretrained model, and
    wherein each of the binary values is respectively one of a first value for activating a corresponding element in the filter of the pretrained model and a second value for deactivating a corresponding element in the filter of the pretrained model.

7. The method of claim 1, wherein, for a mask weight outside the searching range of the mask weights, the binary mask is set to be a value for activating a corresponding element in the filter of the pretrained model.

8. The method of claim 1, wherein the updating of the portion of the binary mask comprises:
    updating an element of the binary mask corresponding to the targeted mask weight among a plurality of element values included in the binary mask.

9. The method of claim 1, wherein the identifying of the targeted mask weight further comprises generating a target vector associated with a position of the targeted mask weight in the mask weights, and
    wherein the updating of the targeted mask weight further comprises, based on the generated target vector, updating the mask weights by applying the updated targeted mask weight to the mask weights.

10. The method of claim 1, wherein the identifying of the targeted mask weight further comprises generating a target vector associated with a position of the targeted mask weight in the mask weights, and wherein the updating of the portion of the binary mask further comprises, based on the generated target vector, updating an element corresponding to the targeted mask weight in the binary mask based on a result of comparing the targeted mask weight and the reference value.

11. The method of claim 1, wherein the setting of the searching range based on the mean of the mask weights from the distribution of the mask weights further comprises setting the searching range based on a variance of the mask weights from the distribution of the mask weights.

12. The method of claim 1, further comprising:
initializing the binary mask by initializing a mask weight of the binary mask corresponding to the filter of the pretrained model to be a constant greater than the reference value; and
determining the distribution of the mask weights by performing one or more training epochs for updating the mask weights based on the binary mask and the pretrained model.

13. A non-transitory computer-readable storage medium storing instructions that, when executed by one or more processors, configure the one or more processors to perform the learning method of claim 1.

14. A neural network apparatus, comprising:
one or more processors configured to:
set a searching range of mask weights based on both of a distribution of the mask weights of a binary mask corresponding to a filter of a pretrained model and a learning rate-related parameter set in an incremental learning model;
identify a targeted mask weight in the searching range of the mask weights;
calculating a weight gradient corresponding to the targeted mask weight based on an input activation of an input channel of a masked filter obtained from forward propagation of a training epoch process and a loss gradient obtained from back propagation of the training epoch process, wherein the masked filter is obtained by activating or deactivating each weight included in the filter based on the binary mask;
update the targeted mask weight based on the binary mask and the pretrained model;
update a portion of the binary mask corresponding to the updated targeted mask weight based on a preset reference value; and
updating the masked filter by applying the updated binary mask to the masked filter for a next training epoch process of the pretrained model; and
a memory configured to store therein the targeted mask weight,
wherein the setting of the searching range comprises:
when the distribution of the mask weights is obtained, setting the searching range based on a mean of the mask weights from the distribution of the mask weights; and
when it is determined that the learning rate-related parameter that determines a level of learning rate decay has changed according to predefined criteria, setting the searching range based on the level of learning rate decay,
wherein the training epoch process is included in a process for training the pretrained model, which is configured to perform a task, to perform a second task,
wherein a non-target mask weight not in the searching range is not updated during the training epoch process and is fixed as a value determined in a previous training epoch, and
wherein a value of the binary mask corresponding to the non-targeted mask weight is fixed as a value determined in the previous training epoch.

15. The apparatus of claim 14, wherein, for the updating of the targeted mask weight, the one or more processors are configured to:
repeat the training epoch by a preset number of times.

16. The apparatus of claim 15, wherein the one or more processors are configured to:
reset the searching range based on another learning rate-related parameter obtained through the repetition of the training epoch; and
identify another targeted mask weight in the reset searching range among the mask weights.

17. The apparatus of claim 14, wherein the binary mask is determined to be a bi Previously Presented nary value for each of the mask weights by comparing the mask weights to the reference value, and
wherein the binary value is one of a first value for activating a corresponding element in the filter of the pretrained model and a second value for deactivating a corresponding element in the filter of the pretrained model.

18. The apparatus of claim 14, wherein the one or more processors are configured to:
for the identifying of the targeted mask weight, generate a target vector associated with a position of the targeted mask weight in the mask weights and record the generated target vector in the memory; and
for the updating of the targeted mask weight, update the mask weights by applying the updated targeted mask weight to the mask weights.

19. The apparatus of claim 14, wherein the memory is configured to:
store therein a target vector associated with a position of the targeted mask weight in the mask weights,
wherein the one or more processors are configured to:
for the updating of the portion of the binary mask, update an element corresponding to the targeted mask weight in the binary mask based on a result of comparing the targeted mask weight and the reference value.

* * * * *